United States Patent
Carpenter, II et al.

(10) Patent No.: US 6,353,074 B1
(45) Date of Patent: Mar. 5, 2002

(54) METHOD FOR MANUFACTURING HYDROGEN-SILSESQUIOXANE RESIN

(75) Inventors: Leslie Earl Carpenter, II, Midland, MI (US); Tetsuyuki Michinio, Kanagawa (JP)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/441,967

(22) Filed: Nov. 17, 1999

(30) Foreign Application Priority Data

Nov. 18, 1998 (JP) .............................. 10-328143

(51) Int. Cl.[7] .................. C08G 77/06; C08G 77/08
(52) U.S. Cl. ...................... 528/23; 528/31; 556/451; 556/452
(58) Field of Search ............... 528/23, 31; 556/451, 556/452

(56) References Cited

U.S. PATENT DOCUMENTS

| | | | | |
|---|---|---|---|---|
| 3,615,272 A | | 10/1971 | Collins et al. ................. 23/366 |
| 4,756,977 A | | 7/1988 | Haluska et al. ............. 428/704 |
| 5,010,159 A | * | 4/1991 | Bank et al. ................... 528/23 |
| 5,545,255 A | | 8/1996 | Ogawa ....................... 106/272 |
| 5,853,808 A | * | 12/1998 | Arkles et al. ................. 427/377 |
| 5,973,095 A | * | 10/1999 | Hacker et al. ................. 528/12 |
| 6,043,330 A | * | 3/2000 | Hacker et al. ................. 528/12 |
| 6,143,855 A | * | 11/2000 | Hacker et al. ................. 528/31 |

FOREIGN PATENT DOCUMENTS

| | | |
|---|---|---|
| JP | 47-31838 | 8/1972 |
| JP | 6-41518 | 2/1994 |

* cited by examiner

*Primary Examiner*—Robert Dawson
*Assistant Examiner*—Jeffrey B. Robertson
(74) *Attorney, Agent, or Firm*—Sharon K. Severance

(57) ABSTRACT

The present invention pertains to a method for manufacturing a hydrogen-silsesquioxane resin in which a solution of $HSiCl_3$ in a halogenated hydrocarbon solvent which can dissolve the organic sulfonic acid described below and which does not react with sulfuric acid is added to a two-phase system comprising [a] an aqueous phase which contains sulfuric acid and an organic sulfonic acid which is not sulfonated by sulfuric acid and which is soluble in both water and the organic phase described below, and [b] an organic phase which contains the halogenated hydrocarbon solvent, and the resulting mixture is agitated. In this method, the ratio of the sulfuric acid relative to the combined weight of the water (including water of hydration in cases where the above sulfonic acid contains such water of hydration) and sulfuric acid is 80 to 96 wt %, and is present in the organic phase at the rate of 0.008 moles/L or greater.

19 Claims, No Drawings

METHOD FOR MANUFACTURING HYDROGEN-SILSESQUIOXANE RESIN

FIELD OF THE INVENTION

The present invention relates to a method for manufacturing a hydrogen-silsesquioxane resin by the hydrolytic condensation of trichlorosilane ($HSiCl_3$). This invention also relates to a method for manufacturing a hydrogen-silsesquioxane resin which allows more or less complete re-utilization of the solvent, sulfuric acid and surfactants used, without any loss of these compounds.

BACKGROUND OF THE INVENTION

Hydrogen-silsesquioxane resins are useful precursor substances for silica-containing ceramic coatings. For example, U.S. Pat. No. 4,756,977 discloses a method for forming a coating in which a hydrogen-silsesquioxane resin is diluted with a solvent, applied to a substrate, and then forming a ceramic or ceramic-like coating by heating.

When trichlorosilane is subjected to hydrolytic condensation caused by direct contact with water, the reaction occurs abruptly, and the resin that is produced gels. Accordingly, various methods for manufacturing hydrogen-silsesquioxane resins (which are hydrolytic condensation products of trichlorosilane) while preventing such gelation have been proposed in the past.

For example, a method in which a hydrogen-silsesquioxane resin is manufactured by subjecting a solution of trichlorosilane dissolved in a hydrocarbon solvent to hydrolytic condensation while mixing said solution in a two-phase reaction medium consisting of concentrated sulfuric acid and an aromatic hydrocarbon is disclosed in Japanese Patent Application Kokoku No. Sho 47-31838. In that patent application, the aforementioned concentrated sulfuric acid and aromatic hydrocarbon react to produce an arylsulfonic acid hydrate, and the water of hydration in this hydrate contributes to the hydrolytic condensation of the aforementioned trichlorosilane. Then, a hydrogen-silsesquioxane resin produced by this hydrolytic condensation is obtained from the organic phase, and a mixture of concentrated sulfuric acid, arylsulfonic acid hydrate and non-hydrated arylsulfonic acid are obtained from the concentrated sulfuric acid phase. The non-hydrated arylsulfonic acid is obtained in large quantities. In experiments performed by the present inventors, it was found that when water is added to the concentrated sulfuric acid phase in an attempt to recover and reuse the arylsulfonic acid contained in said phase, precipitation occurs (for unknown reasons), so that the arylsulfonic acid cannot be reused. For this reason, large quantities of organic solvent and sulfuric acid are lost.

A method in which a hydrogen-silsesquioxane resin is formed by adding a solution containing trichlorosilane to a hydrolysis medium containing an arylsulfonic acid hydrate while this hydrolysis medium is agitated in described in Japanese Patent Application Kokai No. Hei 6-41518. That patent application describes a method in which concentrated sulfuric acid is added to toluene or benzene as a method for manufacturing the above mentioned hydrolysis medium containing an arylsulfonic acid hydrate. Furthermore, it is indicated that the water of hydration contained in the arylsulfonic acid hydrate thus formed is utilized in the hydrolytic condensation of the trichlorosilane. No mention is made concerning the re-utilization of the non-hydrated arylsulfonic acid that is produced, or concerning the recovery in any way of the organic solvent or sulfuric acid in that reference.

The present invention relates to a method for manufacturing a hydrogen-silsesquioxane resin by the hydrolytic condensation of trichlorosilane ($HSiCl_3$). An object of the present invention is to provide a method for manufacturing a hydrogen-silsesquioxane resin which allows more or less complete re-utilization of the solvent, sulfuric acid and surfactants used, essentially without loss of these compounds.

SUMMARY OF THE INVENTION

The present invention pertains to a method for the manufacture of a hydrogen-silsesquioxane resin by the hydrolytic condensation of trichlorosilane ($HSiCl_3$) in a two-phase system consisting of (I) aqueous phase: an aqueous solution in which sulfuric acid and an organic sulfonic acid selected from aromatic sulfonic acids or aliphatic sulfonic acids are dissolved, with the sulfuric acid comprising 80 to 96 wt % of the total amount of sulfuric acid and water present in the aqueous phase (in cases where the organic sulfonic acid is a hydrate, this includes the water of hydration contained in said hydrate); and (II) organic phase: a solution formed by dissolving the organic sulfonic acid at the rate of 0.008 moles/liter or greater in a halogenated hydrocarbon solvent which is capable of dissolving the trichlorosilane, and which has no substantial reactivity with respect to sulfuric acid.

DETAILED DESCRIPTION OF THE INVENTION

The present invention is a method for manufacturing a hydrogen-silsesquioxane resin in which trichlorosilane ($HSiCl_3$) is subjected to a hydrolytic condensation in a two-phase system consisting of an aqueous phase (I) and an organic phase (II) shown below:

(I) aqueous phase: an aqueous solution in which sulfuric acid and an organic sulfonic acid selected from aromatic sulfonic acids or aliphatic sulfonic acids are dissolved, with the sulfuric acid comprising 80 to 96 wt % of the total amount of sulfuric acid and water present in the aqueous phase (in cases where the organic sulfonic acid is a hydrate, this includes the water of hydration contained in said hydrate); and (II) organic phase: a solution formed by dissolving the organic sulfonic acid at the rate of 0.008 moles/liter or greater in a halogenated hydrocarbon solvent which is capable of dissolving the trichlorosilane, and which has no substantial reactivity with respect to sulfuric acid; here, the weight ratio of the organic sulfonic acid (excluding the weight of the water of hydration contained in the compound in cases where said organic sulfonic acid is a hydrate) relative to the total weight of the sulfuric acid, organic sulfonic acid and (if necessary) water that are added in order to form the two phases is 5 wt % or greater.

As described above, the aqueous phase in the present invention comprises water, a large quantity of sulfuric acid and an organic sulfonic acid comprising the major portion of the aqueous phase. It is necessary that the concentration of sulfuric acid in this aqueous phase be in the range of 80 wt % to 96 wt % of the combined weight of water and sulfuric acid present in the aqueous phase. Described herein, the term "water present in the aqueous phase" naturally also includes water contained in the aqueous solution of sulfuric acid that is added to the aqueous phase, and water separated from organic sulfonic acids having water of hydration in the aqueous phase.

In cases where the concentration of sulfuric acid is outside the above mentioned range, the yield drops noticeably even if the other conditions of the present invention are satisfied.

Furthermore, the sulfuric acid that is used to form the aqueous phase may be an aqueous solution of sulfuric acid, 100% sulfuric acid or fuming sulfuric acid. The sulfuric acid used for the purpose of forming the aqueous phase is ordinarily added in the form of an aqueous solution of sulfuric acid. In cases where the amount of water that may be contained in the sulfuric acid and the amount of water of hydration that may be possessed by the organic sulfonic acid are insufficient for the hydrolytic condensation of the trichlorosilane, water must be separately added.

A solvent which can dissolve both trichlorosilane and a surfactant, and which has no substantial reactivity with respect to sulfuric acid, is selected as the halogenated hydrocarbon solvent used in the organic phase in the present invention. Here, the term "no substantial reactivity" means that no reaction occurs when the halogenated hydrocarbon solvent and the sulfuric acid are used in the manufacturing method of the present invention, or that the reaction rate is extremely slow so that the solvent is consumed by the reaction at a level that causes no practical problems.

Examples of such halogenated hydrocarbon solvents include aliphatic halogenated hydrocarbon solvent, especially aliphatic halogenated hydrocarbon solvents with 3 to 12 carbon atoms, and aromatic halogenated hydrocarbon solvents, especially aromatic halogenated hydrocarbon solvents with 6 to 18 carbon atoms. The following compounds may be cited as examples (although the present invention is not limited to these examples): isopropyl chloride, 1-chloropropane, 1-chlorobutane, 1-chloropentane, 1-chlorooctane, trichloroethylene, perchloroethylene, bromobenzene, chlorobenzene, o-dichlorobenzene and p-trifluoromethylchlorobenzene.

Examples of preferred solvents from the standpoints of yield and non-reactivity with sulfuric acid, etc. include isopropyl chloride, 1-chloropentane, chlorobenzene, o-dichlorobenzene and p-trifluoromethylchlorobenzene (para-$CF_3$—$C_6H_4$—Cl).

The organic sulfonic acids used in the present invention are selected from aromatic sulfonic acids or aliphatic sulfonic acids which are soluble in both water and the halogenated hydrocarbon solvent used in the manufacturing method of the present invention. Since aromatic sulfonic acids and aliphatic sulfonic acids have a low reactivity with the sulfuric acid used in the manufacturing method of the present invention, these compounds are capable of exhibiting a stable surfactant function in the reaction system.

The aromatic sulfonic acids have structures in which —$SO_3H$ groups are bonded directly to aromatic rings. Organic substituent groups may be bonded to these aromatic rings, or may be absent. There are no particular restrictions on these compounds, as long as the compounds are soluble in both water and halogenated hydrocarbon solvents. These sulfonic acids may be unsubstituted aromatic sulfonic acids or substituted aromatic sulfonic acids. Furthermore, these compounds are not restricted in terms of the presence or absence of water of hydration. Examples of these acids include the following:
(1) Unsubstituted Aromatic Sulfonic Acids such as benzenesulfonic acid ($C_6H_5SO_3H.1.5$~$2.0H_2O$). This compound may also be an acid anhydride.
(2) Substituted Aromatic Sulfonic Acids such as
(a) alkylbenzenesulfonic Acids
① Toluenesulfonic acid ($CH_3C_6H_4SO_3H$); this may be o-toluenesulfonic acid, p-toluenesulfonic acid or m-toluene sulfonic acid, and may have water of hydration.
② 2,5-Dimethylbenzenesulfonic acid
③ 3,4-Dimethylbenzenesulfonic acid
④ m-Xylenesulfonic acid
(b) Aromatic sulfonic acids substituted by unsaturated groups, such as styrenesulfonic acid, etc., may be cited as examples of substituted aromatic sulfonic acids other than those listed under (a).
(3) Halogenated Benzenesulfonic Acids
4-Chlorobenzenesulfonic acid (Cl—$C_6H_4$—$SO_3H$)
4-Chlorobenzenesulfonic acid monohydrate (Cl—$C_6H_4$—$SO_3H.H_2O$)

The above aliphatic sulfonic acids have structures in which —$SO_3H$ groups are bonded to aliphatic groups. There are no particular restrictions on these compounds, as long as the compounds are soluble in both water and halogenated hydrocarbon solvents, including saturated aliphatic sulfonic acids and unsaturated aliphatic sulfonic acids. For example, such acids may include:
(1) Saturated Aliphatic Sulfonic Acids
Methanesulfonic acid ($CH_3$—$SO_3H$)
Ethanesulfonic acid ($C_2H_5$—$SO_3H$)
(2) Unsaturated Aliphatic Sulfonic Acids
Alkenylsulfonic acids with 3 or 4 carbon atoms
If the degree of non-reactivity with respect to sulfuric acid is taken into consideration, the following organic sulfonic acids are preferred: benzenesulfonic acid, hydrates of benzenesulfonic acid, p-toluenesulfonic acid, hydrates of p-toluenesulfonic acid, and ethanesulfonic acid.

In the present invention, two phases comprising an organic phase and an aqueous phase comprising the reaction medium are formed. Sulfuric acid, an organic sulfonic acid, a halogenated hydrocarbon and (if necessary) water are added in order to form these two phases. Among these compounds, it is desirable that the weight ratio of the organic sulfonic acid relative to the combined weight of the sulfuric acid and water that is added if necessary (in cases where water of hydration is present, the weight of this water is excluded) be 5 wt % or greater. In cases where the ratio is less than this value, the yield of the hydrogen-silsesquioxane resin drops noticeably even if the other conditions of the present invention are satisfied. There are no particular restrictions on the upper limit of the ratio, as long as the ratio is in a range that allows dissolution of the organic sulfonic acid used in the aqueous phase; ordinarily, however, an amount in the range of 5 wt % to 40 wt % is used. In the case of organic sulfonic acids which have a high solubility in the aqueous phase, there may be cases in which a sufficient yield can be obtained even if the upper limit of the above range is exceeded; however, considering the economy of the yield of the hydrogen-silsesquioxane resin and the amount of organic sulfonic acid used, the above range is recommended.

In the present invention, a two-phase system comprising the aqueous phase and organic phase is prepared beforehand, and trichlorosilane is added to this two-phase system. It is preferable to add a trichlorosilane solution prepared by dissolving trichlorosilane in a halogenated hydrocarbon solvent. In the two-phase system comprising an aqueous phase and organic phase to which the trichlorosilane solution is added, it is preferred that the organic sulfonic acid be present at the rate of 0.008 moles/L or greater in the organic phase. If the organic sulfonic acid concentration is less than this, the yield of the hydrogen-silsesquioxane resin drops noticeably even if the other conditions of the present invention are satisfied. There is no particular stipulation of the upper limit of this concentration; ordinarily, however, a concentration of up to 2 moles/L is used. A yield that is sufficient in practical terms is insured if an organic sulfonic acid is present in an amount up to this level in the organic phase.

Typically, the method of manufacture of the present invention is as follows:

1) An organic sulfonic acid solution is prepared by dissolving the organic sulfonic acid in an aqueous solution of sulfuric acid (hereafter referred to as a "organic sulfonic acid solution"). This solution may be prepared by adding the necessary amount of water.

2) The organic sulfonic acid solution is dissolved in the halogenated hydrocarbon solvent, thus preparing a reaction medium consisting of two phases, i.e., an aqueous phase and an organic phase.

3) A trichlorosilane solution is prepared by dissolving $HSiCl_3$ in the halogenated hydrocarbon solvent.

4) While the reaction medium is vigorously agitated, the trichlorosilane solution is gradually added. Dropwise addition may be cited as a common method used to accomplish this addition operation. The time required for the addition of the trichlorosilane solution depends on the amount of trichlorosilane solution added; however, in cases where the trichlorosilane solution consists of trichlorosilane and a halogenated hydrocarbon solvent at a weight ratio of approximately 1:1, a time of several minutes to several tens of minutes is sufficient.

5) Following the completion of the above addition, the system is agitated for (e.g.) approximately 30 minutes to 120 minutes, ordinarily at a temperature ranging from 10° C. to a temperature below the boiling point of trichlorosilane. In practical terms, a temperature ranging from room temperature to approximately 25° C. is selected.

6) Next, the organic phase and aqueous phase are separated using a separating funnel.

7) The organic phase is washed by ordinary methods. For example, the organic phase may be neutralized by the addition of calcium carbonate, and then dehydrated by the addition of magnesium sulfate, after which the organic phase is filtered.

8) The solid matter that is obtained is stripped, thus producing a hydrogen-silsesquioxane resin.

In order to achieve the hydrolytic condensation of 1 mole of $HSiCl_3$, it is necessary to use 1.5 moles of water or more. In the present invention, it is preferred to use such an amount of water or more. Ordinarily, the water content added is adjusted in accordance with the amount of $HSiCl_3$ used. Furthermore, in cases where the necessary amount of water is insured by water originating in the aqueous solution of sulfuric acid or in the organic sulfonic acid (hydrate), it is of course not necessary to add water separately.

Embodiments of the present invention will be described below. A first embodiment is a method for making a hydrogen-silsesquioxane resin wherein trichlorosilane ($HSiCl_3$) is subjected to a hydrolytic condensation reaction which comprises preparing an aqueous phase by dissolving an organic sulfonic acid selected from aromatic sulfonic acids or aliphatic sulfonic acids in aqueous sulfuric acid, wherein the sulfuric acid comprises 80 to 96 wt % of the total amount of sulfuric acid and water present in the aqueous phase. Then a reaction medium is prepared wherein the reaction medium comprises an aqueous phase and an organic phase by adding the aqueous phase to a halogenated hydrocarbon solvent which is capable of dissolving the trichlorosilane, and which has no substantial reactivity with respect to sulfuric acid. Next trichlorosilane ($HSiCl_3$) is added to the reaction medium while mixing the reaction medium. The organic phase containing the hydrogen-silsesquioxane and aqueous phase are separated and the hydrogen-silsesquioxane resin is removed from the organic phase.

In a second embodiment, the hydrolytic condensation is performed by adding a solution prepared by dissolving trichlorosilane in the halogenated hydrocarbon solvent to prior to adding to the two-phase system.

EXAMPLES

The present invention is illustrated by the following non-limiting examples. Examples 1, 2, 3, 8, 10 and 17 are comparative examples, and the remaining examples are examples of the invention. In the following examples, the concentration of the organic sulfonic acid in the organic phase was measured by proton NMR. Percentages (%) unless noted are by weight percent.

Example 1

Comparative Example

A solution (aqueous phase) was prepared by dissolving 50.2 g of p-toluenesulfonic acid monohydrate in 151.3 g of 90% sulfuric acid (this refers to an aqueous solution with a sulfuric acid concentration of 90 wt %). The "proportion of organic sulfonic acid (A)" (described below) and the "proportion of sulfuric acid (B)" (described below) in this solution (aqueous phase) are shown in Table 1. This solution was mixed with 270.2 g (384 mL) of octane, thus producing a two-phase mixture consisting of an aqueous phase and an organic phase. A solution prepared by dissolving 48.1 g of $HSiCl_3$ in 45.2 g of octane was added to this mixture over a period of 40 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 0.5 g (yield 3%) of a soluble resin (hydrogen-silsesquioxane resin). Furthermore, as a result of this experiment, it was found that p-toluenesulfonic anhydride is insoluble in octane.

Example 2

Comparative Example

A solution (aqueous phase) was prepared by dissolving 50.6 g of p-toluenesulfonic acid monohydrate in 151.9 g of 90% sulfuric acid. The "proportion of organic sulfonic acid (A)" (described below) and the "proportion of sulfuric acid (B)" (described below) in this solution (aqueous phase) are shown in Table 1. This solution was mixed with 295.8 g (384 mL) of methylcyclohexane, thus producing a two-phase mixture consisting of an aqueous phase and an organic phase. A solution prepared by dissolving 49.0 g of $HSiCl_3$ in 49.4 g of methylcyclohexane was added to this mixture over a period of 40 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 1.3 g (yield 7%) of a soluble resin (hydrogen-silsesquioxane resin). Furthermore, as a result of this experiment, it was found that p-toluenesulfonic anhydride is insoluble in methylcyclohexane.

Example 3

Comparative Example

A solution (aqueous phase) was prepared by dissolving 50.7 g of p-toluenesulfonic acid monohydrate in 152.1 g of 90% sulfuric acid. The "proportion of organic sulfonic acid (A)" (described below) and the "proportion of sulfuric acid (B)" (described below) in this solution (aqueous phase) are shown in Table 1. This solution was mixed with 332.2 g (384 mL) of toluene, thus producing a two-phase mixture consisting of an aqueous phase and an organic phase. A solution prepared by dissolving 50.0 g of $HSiCl_3$ in 55.6 g of octane was added to this mixture over a period of 40 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 16.8 g (yield 86%) of a soluble resin (hydrogen-silsesquioxane resin). Furthermore, as a result of this experiment, it was found that p-toluenesulfonic anhydride has an extremely high solubility in toluene. Moreover, when additional water was added to the separated aqueous phase under the following conditions, a large amount of precipitation was observed. Aqueous phase:water=100:5 (weight ratio).

Example 4

A solution (aqueous phase) was prepared by dissolving 50.6 g of p-toluenesulfonic acid monohydrate in 151.6 g of 90% sulfuric acid. The "proportion of organic sulfonic acid (A)" (described below) and the "proportion of sulfuric acid (B)" (described below) in this solution (aqueous phase) are shown in Table 1. This solution was mixed with 425.8 g (384 mL) of chlorobenzene, thus producing a two-phase mixture consisting of an aqueous phase and an organic phase. The concentration of p-toluenesulfonic acid in this organic phase was 0.108 moles/L. A solution prepared by dissolving 49.3 g of $HSiCl_3$ in 71.3 g of chlorobenzene was added to this mixture over a period of 40 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 18.4 g (yield 95%) of a soluble resin (hydrogen-silsesquioxane resin). Furthermore, as a result of this experiment, it was found that p-toluenesulfonic anhydride has an extremely high solubility in chlorobenzene. Moreover, when additional water was added to the separated aqueous phase under the following conditions, no precipitation occurred. Aqueous phase:water=100:5 (weight ratio).

Example 5

A solution (aqueous phase) was prepared by dissolving 50.6 g of p-toluenesulfonic acid monohydrate in 151.8 g of 90% sulfuric acid. The "proportion of organic sulfonic acid (A)" (described below) and the "proportion of sulfuric acid (B)" (described below) in this solution (aqueous phase) are shown in Table 1. This solution was mixed with 500.3 g (384 mL) of chlorobenzene, thus producing a two-phase mixture consisting of an aqueous phase and an organic phase. The concentration of p-toluenesulfonic acid in this organic phase was 0.118 moles/L. A solution prepared by dissolving 48.2 g of $HSiCl_3$ in 83.5 g of o-dichlorobenzene was added to this mixture over a period of 40 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 14.0 g (yield 74%) of a soluble resin (hydrogen-silsesquioxane resin). Furthermore, as a result of this experiment, it was found that p-toluenesulfonic anhydride has an extremely high solubility in o-dichlorobenzene. Moreover, when additional water was added to the separated aqueous phase under the following conditions, no precipitation occurred. Aqueous phase:water=100:5 (weight ratio).

Example 6

A solution (aqueous phase) was prepared by dissolving 50.8 g of p-toluenesulfonic acid monohydrate in 151.6 g of 90% sulfuric acid. The "proportion of organic sulfonic acid (A)" (described below) and the "proportion of sulfuric acid (B)" (described below) in this solution (aqueous phase) are shown in Table 1. This solution was mixed with 330.4 g (384 mL) of isopropyl chloride, thus producing a two-phase mixture consisting of an aqueous phase and an organic phase. The concentration of p-toluenesulfonic acid in this organic phase was 0.046 moles/L. A solution prepared by dissolving 47.0 g of $HSiCl_3$ in 55.0 g of isopropyl chloride was added to this mixture over a period of 40 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 15.2 g (yield 85%) of a soluble resin (hydrogen-silsesquioxane resin). Furthermore, as a result of this experiment, it was found that p-toluenesulfonic anhydride is soluble in isopropyl chloride. Moreover, when additional water was added to the separated aqueous phase under the following conditions, no precipitation occurred. Aqueous phase:water=100:5 (weight ratio).

Example 7

A solution (aqueous phase) was prepared by dissolving 16.30 g of benzenesulfonic acid monohydrate in 188.4 g of 90% sulfuric acid and 9.60 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.014 moles/L. A solution prepared by dissolving 49.9 g of $HSiCl_3$ in 51.5 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 8.0 g (yield 40.9%) of a soluble resin (hydrogen-silsesquioxane resin). Moreover, when additional water was added to the separated aqueous phase under the following conditions, no precipitation occurred. Aqueous phase:water=100:5 (weight ratio).

Example 8

Comparative Example

A solution (aqueous phase) was prepared by dissolving 16.40 g of benzenesulfonic acid monohydrate in 580.20 g of 98% sulfuric acid and 16.70 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. Absolutely no benzenesulfonic acid was detected in the organic phase. A solution prepared by dissolving 49.9 g of $HSiCl_3$ in 51.7 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 0.1 g (yield 0.5%) of a soluble resin (hydrogen-silsesquioxane resin).

Example 9

A solution (aqueous phase) was prepared by dissolving 48.80 g of benzenesulfonic acid monohydrate in 188.4 g of 90% sulfuric acid and 6.10 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.027 moles/L. A solution prepared by dissolving 45.4 g of $HSiCl_3$ in 51.5 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 14.1 g (yield 79.2%) of a soluble resin (hydrogen-silsesquioxane resin). Moreover, when additional water was added to the separated aqueous phase under the following conditions, no precipitation occurred. Aqueous phase:water=100:5 (weight ratio).

Example 10

Comparative Example

A solution (aqueous phase) was prepared by dissolving 49.0 g of benzenesulfonic acid monohydrate in 580.2 g of 98% sulfuric acid and 13.4 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. Absolutely no benzenesulfonic acid was detected in the organic phase. A solution prepared by dissolving 46.2 g of $HSiCl_3$ in 51.5 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 0.4 g (yield 2.2%) of a soluble resin (hydrogen-silsesquioxane resin).

Example 11

A solution (aqueous phase) was prepared by dissolving 32.70 g of benzenesulfonic acid monohydrate in 183.4 g of 98% sulfuric acid and 13.0 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.018 moles/L. A solution prepared by dissolving 49.2 g of $HSiCl_3$ in 51.5 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 7.2 g (yield 37.3%) of a soluble resin (hydrogen-silsesquioxane resin). Moreover, when additional water was added to the separated aqueous phase under the following conditions, no precipitation occurred. Aqueous phase:water=100:5 (weight ratio).

Example 12

A solution (aqueous phase) was prepared by dissolving 32.6 g of benzenesulfonic acid monohydrate in 183.4 g of 98% sulfuric acid and 13.0 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.018 moles/L. A solution prepared by dissolving 48.5 g of $HSiCl_3$ in 51.5 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 8.7 g (yield 45.8%) of a soluble resin (hydrogen-silsesquioxane resin). Moreover, when additional water was added to the separated aqueous phase under the following conditions, no precipitation occurred. Aqueous phase:water=100:5 (weight ratio).

Example 13

A solution (aqueous phase) was prepared by dissolving 32.6 g of benzenesulfonic acid monohydrate in 183.5 g of 98% sulfuric acid and 13.0 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.018 moles/L. A solution prepared by dissolving 48.2 g of $HSiCl_3$ in 51.5 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 8.7 g (yield 46.1%) of a soluble resin (hydrogen-silsesquioxane resin). Moreover, when additional water was added to the separated aqueous phase under the following conditions, no precipitation occurred. Aqueous phase:water=100:5 (weight ratio).

Example 14

A solution (aqueous phase) was prepared by dissolving 128.3 g of non-hydrated benzenesulfonic acid in 290.1 g of 98% sulfuric acid and 9.2 g of water. The "proportion of organic sulfonic acid (A)" (described below) and the "proportion of sulfuric acid (B)" (described below) in this solution (aqueous phase) are shown in Table 1. This solution was mixed with 200 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.028 moles/L. A solution prepared by dissolving 24.0 g of $HSiCl_3$ in 26.2 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 4.4 g (yield 46.8%) of a soluble resin (hydrogen-silsesquioxane resin). Moreover, when additional water was added to the separated aqueous phase under the following conditions, no precipitation occurred. Aqueous phase:water=100:5 (weight ratio).

Example 15

A solution (aqueous phase) was prepared by dissolving 64.5 g of benzenesulfonic acid monohydrate in 189.2 g of 90% sulfuric acid and 4.6 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.024 moles/L. A solution prepared by dissolving 49.0 g of $HSiCl_3$ in 51.7 g of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 14.0 g (yield 72.9%) of a soluble resin (hydrogen-silsesquioxane resin). Moreover, when additional water was added to the separated aqueous phase under the following conditions, no precipitation occurred. Aqueous phase:water=100:5 (weight ratio).

Example 16

A solution (aqueous phase) was prepared by dissolving 141.4 g of benzenesulfonic acid monohydrate in 172.6 g of 98% sulfuric acid and 12.1 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.045 moles/L. A solution prepared by dissolving 47.5 g of $HSiCl_3$ in 60 mL of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped, thus producing 16.0 g (yield 85.9%) of a soluble resin (hydrogen-silsesquioxane resin). Moreover, when additional water was added to the separated aqueous phase under the following conditions, no precipitation occurred. Aqueous phase:water=100:5 (weight ratio).

Example 17

Comparative Example

A solution (aqueous phase) was prepared by dissolving 48.8 g of benzenesulfonic acid monohydrate in 77.6 g of 98% sulfuric acid and 17.2 g of water. The "proportion of organic sulfonic acid (A)" (described below) and the "proportion of sulfuric acid (B)" (described below) in this solution (aqueous phase) are shown in Table 1. This solution was mixed with 400 mL of isopropyl chloride, thus producing a two-phase mixture consisting of an aqueous phase and an organic phase. The benzenesulfonic acid was distributed in the organic phase. The concentration of benzenesulfonic acid in the organic phase was 0.007 moles/L. A solution prepared by dissolving 48.2 g of $HSiCl_3$ in 51.5 mL of isopropyl chloride was added to this mixture over a period of 40 minutes while the mixture was vigorously agitated. Following the completion of this addition, the reaction mixture was agitated for 2 hours, after which the aqueous phase and organic phase were separated by means of a separating funnel. The organic phase was washed and dried, and was then stripped in a vacuum. In the case of this preparation method, no soluble resin (hydrogen-silsesquioxane resin) was obtained.

Example 18

A solution (aqueous phase) was prepared by dissolving 50.5 g of p-toluenesulfonic acid monohydrate in 151.4 g of 90% sulfuric acid. The "proportion of organic sulfonic acid (A)" (described below) and the "proportion of sulfuric acid (B)" (described below) in this solution (aqueous phase) are shown in Table 1. This solution was mixed with 339.8 g (385 mL) of 1-chloropentane, thus producing a two-phase mixture consisting of an aqueous phase and an organic phase. A solution prepared by dissolving 49.3 g of $HSiCl_3$ in 56.6 g of 1-chloropentane was added to this mixture over a period of 35 minutes while the mixture was vigorously agitated. Following this addition, the reaction mixture was agitated for 2 hours, after which the aqueous phase and organic phase were separated by means of a separating funnel. The organic phase was washed and dried, and was then stripped in a vacuum, thus producing 17.1 g (yield 88%) of a soluble resin (hydrogen-silsesquioxane resin). Furthermore, it was found that p-toluenesulfonic anhydride has an extremely high solubility in 1-chloropentane. Moreover, when additional water was added to the separated aqueous phase under the following conditions, no precipitation occurred. Aqueous phase:water=100:5 (weight ratio).

Example 19

55.0 g of p-toluenesulfonic acid monohydrate, 151.5 g of 90% sulfuric acid and 429.5 g of chlorobenzene were placed in an ordinary 1-liter three-necked flask, and this mixture was agitated and mixed at 300 rpm to produce a two-phase mixture. The "proportion of organic sulfonic acid (A)" (described below) and the "proportion of sulfuric acid (B)" (described below) in this solution (aqueous phase) are shown in Table 1. The concentration of p-toluenesulfonic acid in this organic phase was 0.108 moles/mL. Furthermore, a solution prepared by dissolving 50.0 g of $HSiCl_3$ in 70.0 g of chlorobenzene was added to this mixture]over a period of 50 minutes. Following this addition, the reaction mixture was agitated for 2 hours. Afterward, this mixture was placed in a separation funnel, and the aqueous phase was discharged. The organic phase thus obtained was washed twice with 100 mL of 47% sulfuric acid, and was then washed twice with 100 mL of deionized water. Approximately 20 g of $CaCO_3$ was added to this organic phase, and the resulting mixture was agitated for 10 minutes so that the mixture was neutralized. Next, approximately 20 g of $MgSO_4$ was added, and the resulting mixture was agitated for 10 minutes so that the mixture was dehydrated. This solution was filtered, and the solvent was then stripped. 17.9 g of a soluble resin (hydrogen-silsesquioxane resin) was obtained, for a yield of 91%.

Example 20

190.0 g of the aqueous phase obtained in Example 19 (including a large amount of acid), 10.0 g of water and 429.5 g of chlorobenzene were placed in an ordinary 1-liter three-necked flask, and this mixture was agitated and mixed at 300 rpm to produce a two-phase mixture. Furthermore, a solution prepared by dissolving 50.0 g of $HSiCl_3$ in 70.0 g of chlorobenzene was added [to this mixture] over a period of 60 minutes. Following this addition, the reaction mixture was agitated for 2 hours. Afterward, this mixture was placed in a separation funnel, and the aqueous phase was discharged. The amount of aqueous phase discharged was 186.0 g. After 10.0 g of water was added, absolutely no crystalline solid was observed. The organic phase thus obtained was washed twice with 100 mL of 47% sulfuric acid, and was then washed twice with 100 mL of deionized water. Approximately 20 g of $CaCO_3$ was added to this organic phase, and the resulting mixture was agitated for 10 minutes so that the mixture was neutralized. Next, approximately 20 g of $MgSO_4$ was added, and the resulting mixture was agitated for 10 minutes so that the mixture was dehydrated. This solution was filtered, and the solvent was then stripped. 16.7 g of a soluble resin (hydrogen-silsesquioxane resin) was obtained, for a yield of 85%.

Example 21

50.5 g of benzenesulfonic acid monohydrate, 151.5 g of 90% sulfuric acid and 509.6 g of p-trifluoromethylchlorobenzene were placed in an ordinary 1-liter three-necked flask, and this mixture was agitated and mixed at 300 rpm to produce a two-phase mixture. The "proportion of organic sulfonic acid (A)" (described below) and the "proportion of sulfuric acid (B)" (described below) in this solution (aqueous phase) are shown in Table 1. The concentration of p-trifluoromethylchlorobenzene in this organic phase was 0.043 moles/mL. Furthermore, a solution prepared by dissolving 50.0 g of $HSiCl_3$ in 86.9 g of chlorobenzene was added [to this mixture] over a period of 60 minutes. Following this addition, the reaction mixture was agitated for 2 hours. Afterward, this mixture was placed in a separation funnel, and the aqueous phase was discharged. The amount of aqueous phase discharged was 200.0 g. After 10.0 g of water was added, absolutely no crystalline solid was observed. The organic phase thus obtained was washed twice with 100 mL of 47% sulfuric acid. 100 mL of hexane was added, and the two phases were separated. [The organic phase] was then washed twice with 100 mL of deionized water. Approximately 20 g of $CaCO_3$ was added to this organic phase, and the resulting mixture was agitated for 10 minutes so that the mixture was neutralized. Next, approximately 20 g of $MgSO_4$ was added, and the resulting mixture was agitated for 10 minutes so that the mixture was dehydrated. This solution was filtered, and the solvent was then stripped. 11.7 g of a soluble resin (hydrogen-silsesquioxane resin) was obtained, for a yield of 59.7%.

Example 22

50.5 g of p-toluenesulfonic acid monohydrate, 151.5 g of 90% sulfuric acid and 330.0 g of isopropyl chloride were placed in an ordinary 1-liter three-necked flask, and this mixture was agitated and mixed at 600 rpm to produce a two-phase mixture. The "proportion of organic sulfonic acid (A)" (described below) and the "proportion of sulfuric acid (B)" (described below) in this solution (aqueous phase) are shown in Table 1. The concentration of p-toluenesulfonic acid in this organic phase was 0.045 moles/mL. Furthermore, a solution prepared by dissolving 48.5 g of $HSiCl_3$ in 55.0 g of isopropyl chloride was added [to this mixture] over a period of 55 minutes. Following this addition, the reaction mixture was agitated for 2 hours. Afterward, this mixture was placed in a separation funnel, and the aqueous phase was discharged. The organic phase thus obtained was washed twice with 100 mL of 47% sulfuric acid, and was then washed twice with 100 mL of deionized water. Approximately 20 g of $CaCO_3$ was added to this organic phase, and the resulting mixture was agitated for 10 minutes so that the mixture was neutralized. Next, approximately 20 g of $MgSO_4$ was added, and the resulting mixture was agitated for 10 minutes so that the mixture was dehydrated. This solution was filtered, and the solvent was then stripped. 16.4 g of a soluble resin (hydrogen-silsesquioxane resin) was obtained, for a yield of 86.3%.

Example 23

203.7 g of the acid phase obtained in Example 22, 10.0 g of water and 330.4 g of isopropyl chloride were placed in an ordinary 1-liter three-necked flask, and this mixture was agitated and mixed at 600 rpm to produce a two-phase mixture. Furthermore, a solution prepared by dissolving 46.8 g of $HSiCl_3$ in 55.2 g of isopropyl chloride was added [to this mixture] over a period of 60 minutes. Following this addition, the reaction mixture was agitated for 2 hours. Afterward, this mixture was placed in a separation funnel, and the aqueous phase was discharged. The amount of aqueous phase discharged was 193.6 g. After 10.0 g of water was added, absolutely no crystalline solid was observed. The organic phase thus obtained was washed twice with 100 mL of 47% sulfuric acid, and was then washed twice with 100 mL of deionized water. Approximately 20 g of $CaCO_3$ was added to this organic phase, and the resulting mixture was agitated for 10 minutes so that the mixture was neutralized. Next, approximately 20 g of $MgSO_4$ was added, and the resulting mixture was agitated for 10 minutes so that the mixture was dehydrated. This solution was filtered, and the solvent was then stripped. 17.2 g of a soluble resin (hydrogen-silsesquioxane resin) was obtained, for a yield of 93.8%.

Example 24

A solution (aqueous phase) was prepared by pouring 22.5 g of ethanesulfonic acid, 75.0 g of a 90% aqueous solution of sulfuric acid and 2.5 g of water into a 500-ml three-necked flask. The "proportion of organic sulfonic acid (A)" (described below) and the "proportion of sulfuric acid (B)" (described below) in this solution (aqueous phase) are shown in Table 1.

The concentration of ethanesulfonic acid in the aqueous phase at the time of preparation of the aqueous phase was 22.5 wt %. A two-phase system consisting of an aqueous phase and an organic phase was prepared by adding 172.8 g of isopropyl chloride to the abovementioned aqueous phase.

When the concentration of ethanesulfonic acid in the organic phase was measured, a value of 0.01 moles/L was obtained. An isopropyl chloride solution of trichlorosilane (25.0 g of trichlorosilane/21.30 g of isopropyl chloride) was added dropwise to the two-phase system over a period of 70 minutes while this system was agitated. Agitation of this reaction mixture was continued for 2 hours. The organic phase was obtained by pouring the reaction mixture into a separating funnel. This organic phase was washed twice with a 47% aqueous solution of sulfuric acid. next, the organic phase was washed twice with ion-exchange water. A drying agent (calcium carbonate) was added to the organic phase, and the resulting mixture was agitated for 10 minutes. A further drying agent (magnesium sulfate) was added to the organic phase, and the resulting mixture was again agitated for 10 minutes. The organic phase was filtered, and the organic solvent was stripped, thus producing 4.5 g of a solvent-soluble resin (hydrogen-silsesquioxane resin). The yield was 45.9%

The above data are summarized in Table 1. The significance of the data shown in the respective columns (A) and (B) in Table 1 is explained below.

(A) Proportion of organic sulfonic acid (excluding water of hydration in the case of a hydrate), units (wt %); this indicates one of the following:

(a) In cases where an organic sulfonic acid solution is prepared from ① an organic sulfonic acid and ② an aqueous solution of sulfuric acid, this indicates the ratio in wt % of the organic sulfonic acid relative to the combined weight of ① and ② (however, in cases where the organic sulfonic acid is a hydrate, the water of hydration contained in this hydrate is excluded).

(b) In cases where an organic sulfonic acid solution is prepared from ① an organic sulfonic acid, ② an aqueous solution of sulfuric acid, and ③ water (added separately), this indicates the ratio in wt % of the organic sulfonic acid relative to the combined weight of ①, ② and ③ (however, in cases where the organic sulfonic acid is a hydrate, the water of hydration contained in this hydrate is excluded).

(B) Proportion of sulfuric acid, units (wt %); this indicates the ratio in wt % of pure sulfuric acid relative to the combined weight of water (including water of hydration in cases where the abovementioned organic sulfonic acid is a hydrate) and sulfuric acid present in the abovementioned surfactant solution (a) or (b).

TABLE 1

| Example No. | Organic Sulfonic Acid | Solvent | (A) Proportion of Organic Sulfonic Acid (wt %) | (B) Proportion of Sulfuric Acid (wt %) | Concentration of Organic Sulfonic Acid in Organic Phase (moles/L) | Yield % |
|---|---|---|---|---|---|---|
| 1 (c) | PTSA—MH | octane | 23 | 87 | — | 3 |
| 2 (c) | PTSA—MH | Me-cyclohexane | 23 | 87 | — | 7 |
| 3 (c) | PTSA—MH | toluene | 23 | 87 | — | 86 |
| 4 | PTSA—MH | chlorobenzene | 23 | 87 | 0.108 | 95 |
| 5 | PTSA—MH | o-dichlorobenzene | 23 | 87 | 0.118 | 74 |
| 6 | PTSA—MH | isopropyl chloride | 23 | 87 | 0.046 | 85 |
| 7 | BS—MH | isopropyl chloride | 7 | 85 | 0.014 | 40.9 |
| 8 (c) | BS—MH | isopropyl chloride | 2 | 95 | 0 | 0.5 |
| 9 | BS—MH | isopropyl chloride | 18 | 85 | 0.027 | 79.2 |
| 10 (c) | BS—MH | isopropyl chloride | 7 | 95 | 0 | 2.2 |
| 11 | BS—MH | isopropyl chloride | 13 | 90 | 0.018 | 37.3 |
| 12 | BS—MH | isopropyl chloride | 13 | 90 | 0.018 | 45.8 |
| 13 | BS—MH | isopropyl chloride | 13 | 90 | 0.018 | 46.1 |
| 14 | NH—BS | isopropyl chloride | 30 | 95 | 0.028 | 46.8 |
| 15 | BS—MH | isopropyl chlonde | 22 | 85 | 0.024 | 72.9 |
| 16 | BS—MH | isopropyl chloride | 39 | 85 | 0.045 | 85.9 |
| 17 (c) | BS—MH | isopropyl chloride | 31 | 75 | 0.007 | 0 |
| 18 | PTSA—MH | 1-chloropentane | 23 | 87 | 0.021 | 88 |
| 19 | PTSA—MH | chlorobenzene | 23 | 87 | 0.108 | 91 |
| 20 | PTSA—MH | chlorobenzene | | | | 85 |
| 21 | BS—MH | p-trifluoromethyl-chlorobenzene | 23 | 87 | 0.043 | 59.7 |
| 22 | PTSA—MH | isopropyl chloride | 23 | 87 | 0.045 | 86.3 |
| 23 | PTSA—MH | isopropyl chloride | — | — | — | 93.8 |
| 24 | NH—ES | | 22.5 | 87 | 0.01 | 45.9 |

Notes)
PTSA—MH: para-toluenesulfonic acid monohydrate
BS—MH: benzenesulfonic acid monohydrate
NH—BS: non-hydrated benzenesulfonic acid
NH—ES: non-hydrated ethanesulfonic acid
(c): comparative example The method of the present invention makes it possible to obtain hydrogen-silsesquioxane resins at a high yield; furthermore, loss due to the reaction of the organic solvent used in the organic phase is small, and the precipitation of benzenesulfonic acid, etc., in the aqueous phase due to supersaturation (as seen in conventional methods) can also be eliminated. Accordingly, the organic solvent used and the sulfuric acid and specified organic sulfonic acid used in the aqueous phase can be effectively re-utilized.

What is claimed is:

1. A method for making a hydrogen-silsesquioxane resin wherein trichlorosilane ($HSiCl_3$) is subjected to a hydrolytic condensation reaction comprising the steps of:
   a. preparing an aqueous phase by dissolving an organic sulfonic acid selected from aromatic sulfonic acids or aliphatic sulfonic acids in aqueous sulfuric acid, wherein the sulfuric acid comprises 80 to 96 wt % of the total amount of sulfuric acid and water present in the aqueous phase;
   b. preparing a reaction medium wherein the reaction medium comprises the aqueous phase and an organic phase by adding the aqueous phase to a halogenated hydrocarbon solvent which is capable of dissolving the trichlorosilane, and which has no substantial reactivity with respect to sulfuric acid;
   c. adding trichlorosilane ($HSiCl_3$) to the reaction medium while mixing the reaction medium;
   d. separating the organic phase containing the hydrogen-silsesquioxane resin and aqueous phase and
   e. removing the hydrogen-silsesquioxane resin from the organic phase.

2. The method as claimed in claim 1 wherein the trichlorosilane is dissolved in a halogenated hydrocarbon solvent.

3. The method of claim 1 wherein the halogenated hydrocarbon solvent is selected from the group consisting of aliphatic halogenated hydrocarbon solvents with 3 to 12 carbon atoms, and aromatic halogenated hydrocarbon solvents with 6 to 18 carbon atoms.

4. The method as claimed in claim 1 wherein the weight ratio of the organic sulfonic acid relative to the total weight of the sulfuric acid, organic sulfonic acid and any water is 5 weight percent or greater.

5. The method of claim 4 wherein the organic sulfonic acid is in the range of 5 to 40 weight percent.

6. The method of claim 1 wherein the organic sulfonic acid is selected from the group consisting of unsubstituted aromatic sulfonic acids, substituted aromatic sulfonic acids, saturated aliphatic sulfonic acids, and unsaturated aliphatic sulfonic acids.

7. The method of claim 6 wherein the organic sulfonic acid is selected from the group consisting of benzenesulfonic acid, toluenesulfonic acid, chlorobenzenesulfonic acid and ethanesulfonic acid.

8. The method of claim 1 wherein the organic sulfonic acid is present in the organic phase at a ratio of 0.008 moles/L or greater.

9. The method of claim 1 wherein the halogenated hydrocarbon solvent, the sulfuric acid and the organic sulfonic acid have been recovered from the method for making a hydrogen-silsesquioxane resin.

10. The method of claim 1 wherein the sulfuric acid is selected from the group consisting of aqueous sulfuric acid, 100% sulfuric acid and fuming sulfuric acid.

11. A method for making a hydrogen-silsesquioxane resin wherein trichlorosilane ($HSiCl_3$) is subjected to a hydrolytic condensation reaction comprising the steps of:
   a. preparing an aqueous phase by dissolving an organic sulfonic acid selected from aromatic sulfonic acids or aliphatic sulfonic acids in aqueous sulfuric acid, wherein the sulfuric acid comprises 80 to 96 wt % of the total amount of sulfuric acid and water present in the aqueous phase;
   b. preparing a reaction medium wherein the reaction medium comprises the aqueous phase and an organic phase by adding the aqueous phase to a halogenated hydrocarbon solvent which is capable of dissolving the trichlorosilane, and which has no substantial reactivity with respect to sulfuric acid;
   c. adding trichlorosilane ($HSiCl_3$) to the reaction medium while mixing the reaction medium;
   d. agitating the reaction medium;
   e. separating the organic phase containing the hydrogen-silsesquioxane and aqueous phase and
   f. removing the hydrogen-silsesquioxane resin from the organic phase.

12. The method as claimed in claim 11 wherein the trichlorosilane is dissolved in a halogenated hydrocarbon solvent.

13. The method of claim 11 wherein the halogenated hydrocarbon solvent is selected from the group consisting of aliphatic halogenated hydrocarbon solvents with 3 to 12 carbon atoms, and aromatic halogenated hydrocarbon solvents with 6 to 18 carbon atoms.

14. The method as claimed in claim 11 wherein the weight ratio of the organic sulfonic acid relative to the total weight of the sulfuric acid, organic sulfonic acid and any water is 5 weight percent or greater.

15. The method of claim 11 wherein the organic sulfonic acid is selected from the group consisting of unsubstituted aromatic sulfonic acids, substituted aromatic sulfonic acids, saturated aliphatic sulfonic acids, and unsaturated aliphatic sulfonic acids.

16. The method of claim 15 wherein the organic sulfonic acid is selected from the group consisting of benzenesulfonic acid, toluenesulfonic acid, chlorobenzenesulfonic acid and ethanesulfonic acid.

17. The method of claim 11 wherein the organic sulfonic acid is present in the organic phase at a ratio of 0.008 moles/L or greater.

18. The method of claim 11 wherein the halogenated hydrocarbon solvent, the sulfuric acid and the organic sulfonic acid have been recovered from the method for making a hydrogen-silsesquioxane resin.

19. The method of claim 11 wherein the sulfuric acid is selected from the group consisting of aqueous sulfuric acid, 100% sulfuric acid and fuming sulfuric acid.

* * * * *